(12) United States Patent
Chen et al.

(10) Patent No.: US 8,593,122 B2
(45) Date of Patent: Nov. 26, 2013

(54) CONTROL METHOD FOR HIGH EFFICIENCY BUCK-BOOST POWER CONVERTER

(75) Inventors: Ke-Horng Chen, Banqiao (TW); Wei-Quan Wu, Hemei Township Changhua County (TW); Hsin-Hsin Ho, Sanchong (TW)

(73) Assignees: Richtek Technology Corp., Hsinchu (TW); National Chiao Tung University, Hsinchu (TW)

( * ) Notice: Subject to any disclaimer, the term of this patent is extended or adjusted under 35 U.S.C. 154(b) by 549 days.

(21) Appl. No.: 12/720,034

(22) Filed: Mar. 9, 2010

(65) Prior Publication Data
US 2010/0231189 A1 Sep. 16, 2010

(30) Foreign Application Priority Data

Mar. 13, 2009 (TW) ................................ 98108283 A

(51) Int. Cl.
*G05F 1/00* (2006.01)
(52) U.S. Cl.
USPC ......................................................... 323/284
(58) Field of Classification Search
USPC ......... 323/259–263, 290, 344, 271, 282–285, 323/234
See application file for complete search history.

(56) References Cited

U.S. PATENT DOCUMENTS

| | | | | |
|---|---|---|---|---|
| 7,116,085 B2 * | 10/2006 | Ikezawa | ...................... | 323/225 |
| 7,265,524 B2 * | 9/2007 | Jordan et al. | .................. | 323/225 |
| 7,453,247 B2 * | 11/2008 | de Cremoux | ................ | 323/285 |
| 7,495,419 B1 * | 2/2009 | Ju | .................. | 323/259 |
| 7,804,283 B2 * | 9/2010 | Krellner et al. | ............... | 323/259 |
| 2006/0284606 A1 * | 12/2006 | Chen et al. | .................... | 323/259 |

* cited by examiner

*Primary Examiner* — Adolf Berhane
*Assistant Examiner* — Jeffrey Gblende
(74) *Attorney, Agent, or Firm* — Muncy, Geissler, Olds & Lowe, PLLC

(57) ABSTRACT

A buck-boost power converter switches the switches thereof with a novel sequence and extends the switching periods of the switches to reduce the switching loss and conduction loss when the input voltage thereof approaches the output voltage thereof. The influence of the load current of the power converter on the duty thereof is taken into account to switch the power converter between modes at correct time points, so as to prevent the output voltage from being affected by the mode switching.

12 Claims, 16 Drawing Sheets

US 8,593,122 B2

CONTROL METHOD FOR HIGH EFFICIENCY BUCK-BOOST POWER CONVERTER

FIELD OF THE INVENTION

The present invention is related generally to a buck-boost power converter and, more particularly, to a control circuit and method for switching loss reduction and smooth mode transition of a buck-boost power converter.

BACKGROUND OF THE INVENTION

As shown in FIG. 1, a conventional buck-boost power converter 10 includes a power stage 12 operated by a control circuit 14. In the power stage 12, a switch SW1 is coupled between a power input terminal Vin and an inductor L, switches SW2 and SW3 are coupled between two terminals of the inductor L and a ground terminal GND respectively, and a switch SW4 is coupled between the inductor L and a power output terminal Vout. Voltage divider resistors R1 and R2 divide the output voltage Vout to generate a feedback signal VFB. In the control circuit 14, an error amplifier 24 generates an error signal VEA according to the feedback signal VFB and a reference voltage Vref, a ramp generator 22 provides two sawtooth signals SAW1 and SAW2, comparators 18 and 20 compare the error signal VEA with the sawtooth signals SAW 1 and SAW2 to generate signals PWM1 and PWM2 respectively, and a control logic 16 generates control signals VA, VB, VC and VD according to the signals PWM1 and PWM2 to switch the switches SW1-SW4 respectively, to thereby convert the input voltage Vin into the output voltage Vout. When the error signal VEA intersects either the sawtooth signal SAW1 or the sawtooth signal SAW2, the power converter 10 operates in a buck mode or a boost mode; when the error signal VEA intersects both the sawtooth signals SAW1 and SAW2, the power converter 10 operates in a buck-boost mode. However, the waveforms of the sawtooth signals SAW1 and SAW2 are not ideally linear near the peaks and the valleys, and therefore, when the input voltage Vin approaches the output voltage Vout, i.e., when the signal PWM1 or PWM2 has a duty ratio approaching 100%, the aforesaid nonlinearity will cause significant ripple in the output voltage Vout.

U.S. Pat. No. 7,176,667 to Chen et al. proposes a buck-boost power converter which, in a buck-boost mode, uses a sawtooth signal and an error signal to intersect to decide a desired buck or boost duty, with a fixed boost or buck duty inserted thereto additionally. However, no matter the power converter of FIG. 1 or the power converter of Chen et al., when it operates in a buck-boost mode, switches are switched in the cyclic sequence that (1) turns on the switches SW2, SW4 and turns off the switches SW1, SW3, (2) turns on the switches SW1, SW4 and turns off the switches SW2, SW3, (3) turns on the switches SW1, SW3 and turns off the switches SW2, SW4, and (4) turns on the switches SW1, SW4 and turns off the switches SW2, SW3. Since the switches are turned on and off several times in each cycle, the resultant switching loss is considerable.

Therefore, it is desired a buck-boost power converter uses a novel switching sequence to reduce switching loss.

SUMMARY OF THE INVENTION

An object of the present invention is to provide a buck-boost power converter and a control method thereof, which use a novel switching sequence to lower switching loss and conduction loss when an input voltage approaches an output voltage.

Another object of the present invention is to provide a buck-boost power converter and a control method thereof, which extend switching periods of switches to lower switching loss when an input voltage approaches an output voltage.

Yet another object of the present invention to provide a buck-boost power converter and a control method thereof, which take into account the influence of a load current on a buck-boost duty so as to switch modes at the correct time points and thereby not to affect the output voltage by the mode switching.

According to the present invention, a buck-boost power converter includes a power stage having at least two switches, and a control circuit to switch the at least two switches. When the power converter operates in a buck-boost mode, the at least two switches are switched in a novel sequence to lower switching loss and conduction loss. In addition, when the power converter enters the buck-boost mode from a buck mode or a boost mode, switching periods of the at least two switches are extended to further reduce the switching loss. Moreover, the influence of a load current on a buck-boost duty is taken into account so that the power converter can switch modes at the correct time points, and in consequence an output voltage of the power converter will not be affected by the mode switching.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 1:
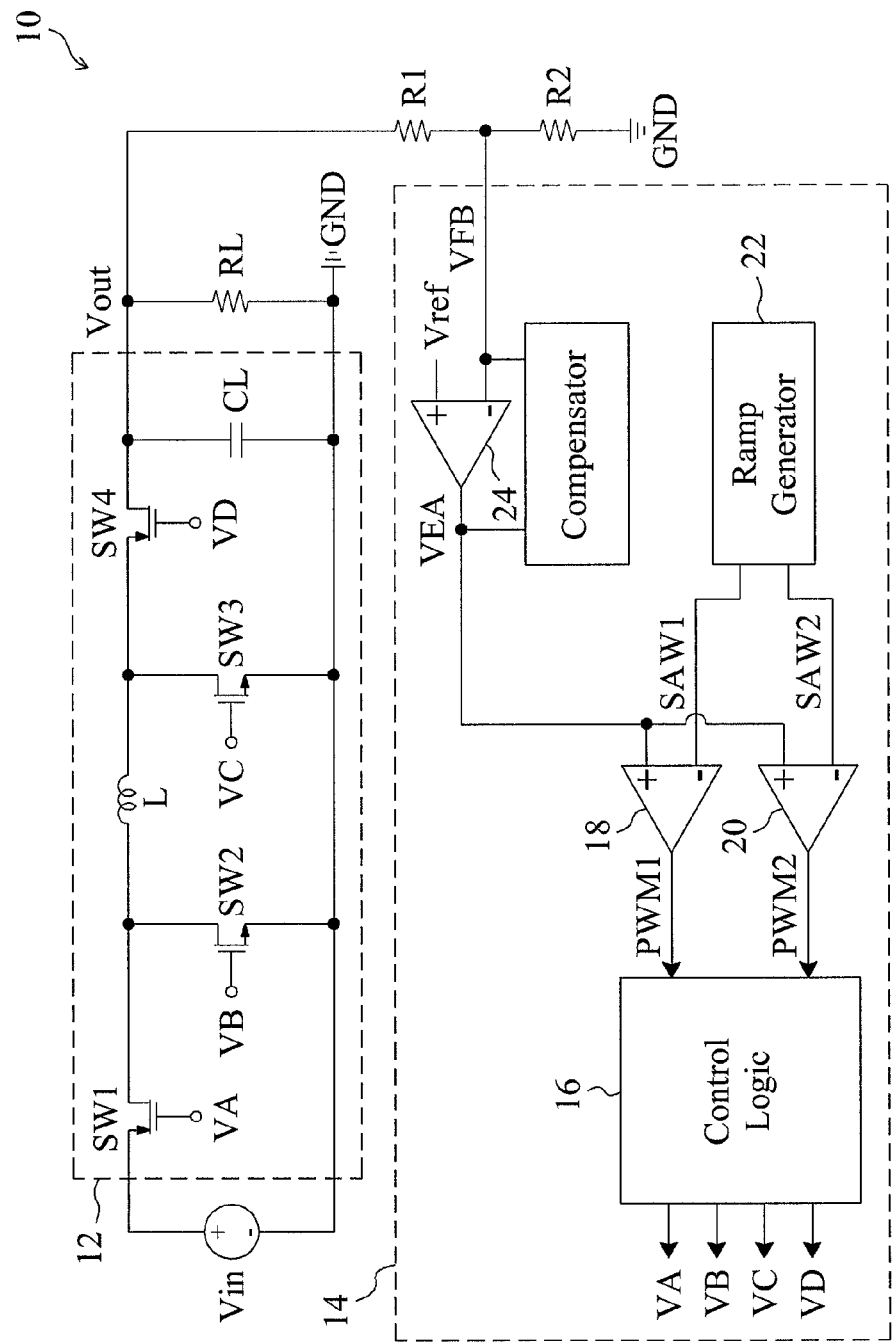
FIG. 1 is a circuit diagram of a conventional buck-boost power converter.
Figure 2:
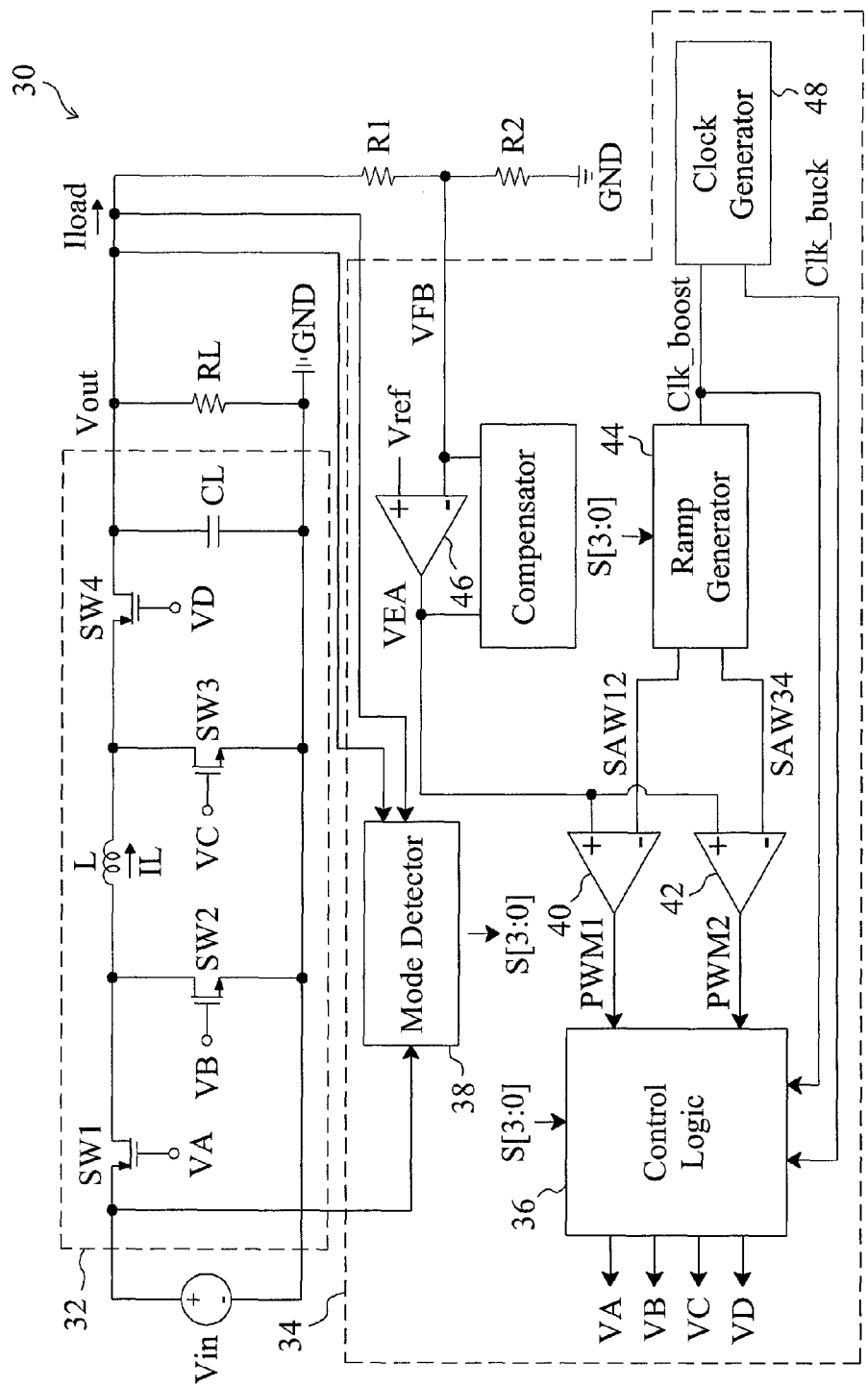
FIG. 2 is a circuit diagram of a first embodiment according to the present invention.

A first embodiment according to the present invention is shown in FIG. 2, in which a buck-boost power converter 30 includes a control circuit 34 to provide control signals VA, VB, VC and VD to drive a power stage 32, so as to convert an input voltage Vin into an output voltage Vout that is divided by voltage divider resistors R1 and R2 to generate a feedback signal VFB for the control circuit 34. In the power stage 32, a switch SW1 is coupled between the power input terminal Vin and an inductor L, switches SW2 and SW3 are coupled between two terminals of the inductor L and a ground terminal GND respectively, and a switch SW4 is coupled between the inductor L and the power output terminal Vout. The duty of the entire system is not only related to the input voltage Vin and the output voltage Vout, but also affected by a load current Iload. Therefore, according to the present invention, the load current Iload is also taken into account when determining the time points at which the power converter 30 switches between modes. In the control circuit 34, a mode detector 38 monitors the input voltage Vin, the output voltage Vout, and the load current Iload to generate a mode select signal S[3:0] to determine the mode that the power converter 30 is to operate therewith, an error amplifier 46 generates an error signal VEA according to a reference voltage Vref and the feedback signal VFB, a clock generator 48 provides clocks Clk_boost and Clk_buck having fixed periods Ts and fixed duties, a ramp generator 44 provides sawtooth signals SAW12 and SAW34 according to the clock Clk_boost and the mode select signal S[3:0], comparators 40 and 42 compare the error signal VEA with the sawtooth signals SAW12 and SAW34 to generate signals PWM1 and PWM2 respectively, and a control logic 36 generates the control signals VA, VB, VC and VD according to the signals PWM1 and PWM2, the mode select signal S[3:0], and the clocks Clk_boost and Clk_buck, to switch the switches SW1-SW4.

Figure 3:
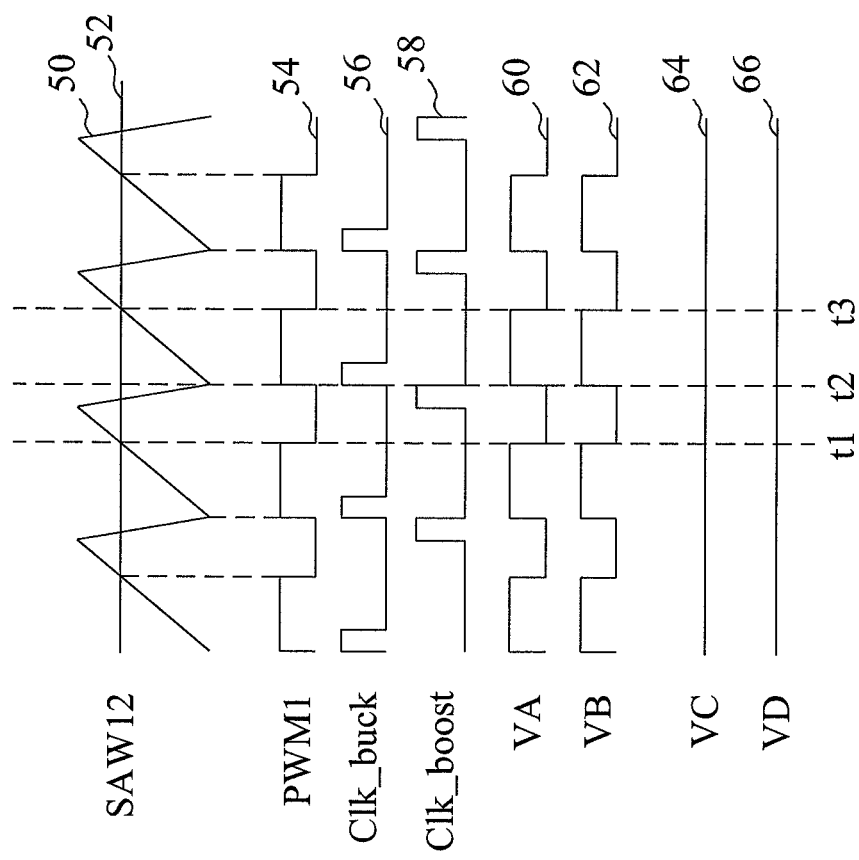
FIG. 3 is a waveform diagram of the power converter of FIG. 2 operating in a first mode.
Figure 4:
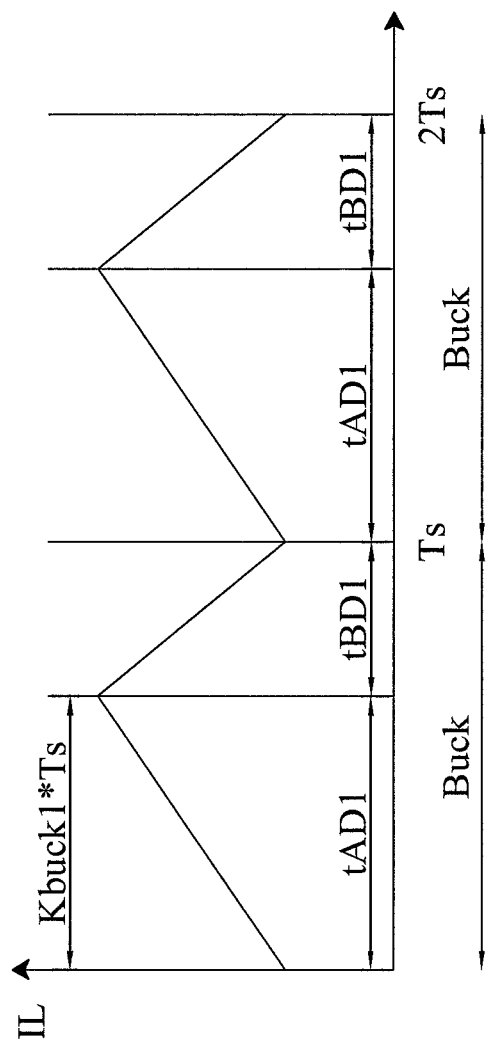
FIG. 4 is a diagram showing an inductor current and a switching sequence of the power converter of FIG. 2 operating in a first mode.

The power converter 30 can operate in four modes. When a voltage ratio, which is determined by the input voltage Vin, the output voltage Vout, and the load current Iload, between the two terminals of the inductor L is smaller than a first threshold value, the power converter 30 operates in a first mode, and FIG. 3 is a waveform diagram thereof. FIG. 4 is a diagram showing an inductor current IL and a switching sequence of the power converter 30 operating in the first mode which is a pure buck mode in this embodiment. During a time period from time t1 to time t2, the control signals VA, VB, VC and VD are low, as shown by waveforms 60, 62, 64 and 66 respectively, and since the switches SW1, SW4 are PMOSes and the switches SW2, SW3 are NMOSes, the switches SW1, SW4 are turned on and the switches SW2, SW3 are turned off. This time period from time t1 to time t2 is defined as tAD1, during which the power supply Vin charges the inductor L and thus the inductor current IL increases, as shown in FIG. 4. During a subsequent time period from time t2 to time t3, the control signals VA, VB are high and the control signals VC, VD remain low. Consequently, the switches SW2, SW4 are turned on and the switches SW1, SW3 are turned off. This time period from time t2 to time t3 is defined as tBD1, during which the inductor L discharges and the inductor current IL decreases. In the first mode, both the switches SW1 and SW2 have a switching period Ts, the inductor current IL has a period equal to Ts, and the buck duty ratio Kbuck1 is equal to the duty ratio of the switch SW1.

Figure 5:
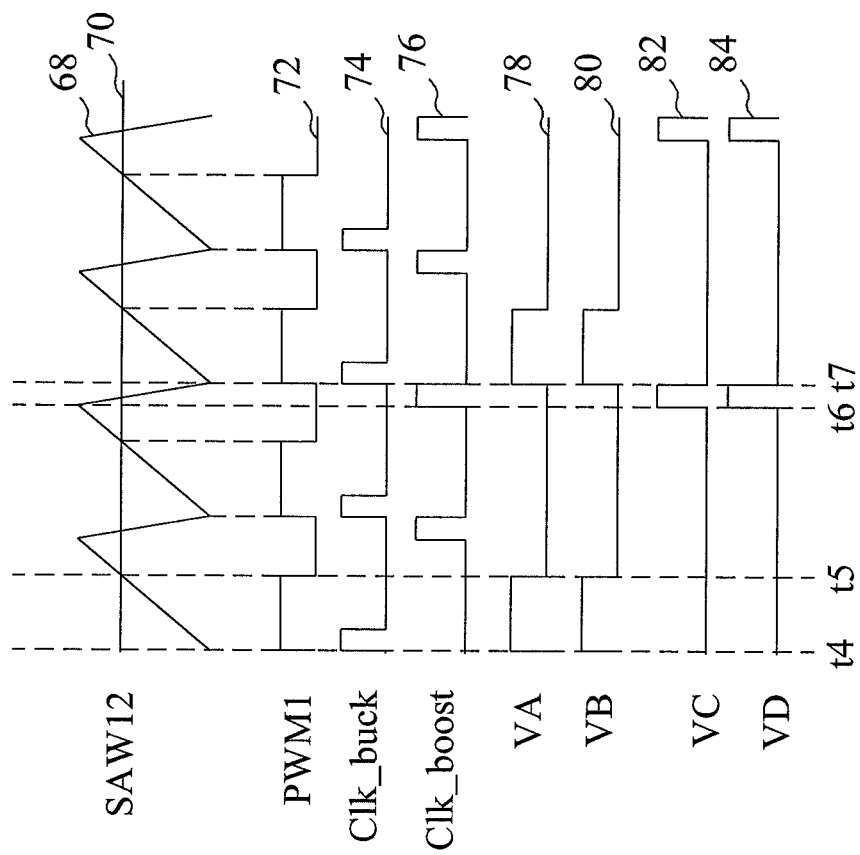
FIG. 5 is a waveform diagram of the power converter of FIG. 2 operating in a second mode.
Figure 6:
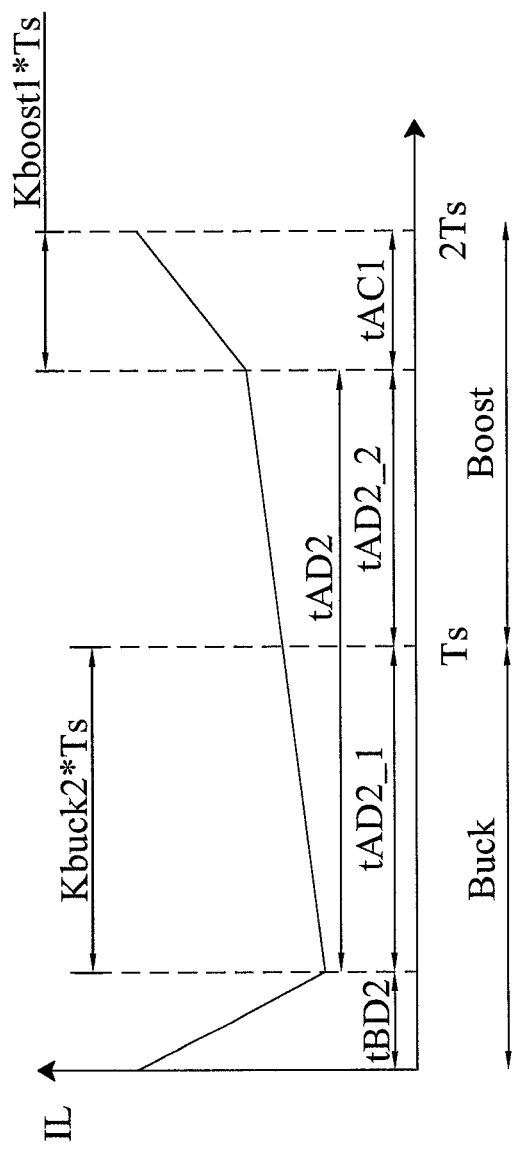
FIG. 6 is a diagram showing an inductor current and a switching sequence of the power converter of FIG. 2 operating in a second mode.

When the voltage ratio between the two terminals of the inductor L, as determined by the input voltage Vin, the output voltage Vout, and the load current Iload, is greater than the first threshold value but smaller than one, the power converter 30 operates in a second mode, and FIG. 5 is a waveform diagram thereof. FIG. 6 is a diagram showing the inductor current IL and a switching sequence of the power converter 30 operating in the second mode which is a buck-boost mode. During a time period from time t4 to time t5, the control signals VA, VB are high and the control signals VC, VD are low, and in consequence, the switches SW1, SW3 are turned off and the switches SW2, SW4 are turned on This time period from time t4 to time t5 is defined as tBD2. During a following time period from time t5 to time t6, all the control signals VA-VD are low and thereby, the switches SW1, SW4 are turned on and the switches SW2, SW3 are turned off. This time period from time t5 to time t6 is defined as tAD2. During a subsequent time period from time t6 to time t7, the control signals VA, VB are low and the control signals VC, VD are high, and thus the switches SW1, SW3 are turned on and the switches SW2, SW4 are turned off. This time period from time t6 to time t7 is defined as tAC1. In the second mode, all the switches SW1-SW4 have a switching period equal to 2Ts, and the inductor current IL also has a period equal to 2Ts. Referring to FIG. 6, each period of the inductor current IL includes buck and boost operations. In the second mode, the duties of the switches SW3 and SW4 are determined by the clock Clk_boost and thus have fixed values. Hence, the boost duty ratio Kboost1 during the boost operation is fixed, and the buck duty ratio Kbuck2 during the buck operation is adjusted to stabilize the output voltage Vout.

Figure 7:
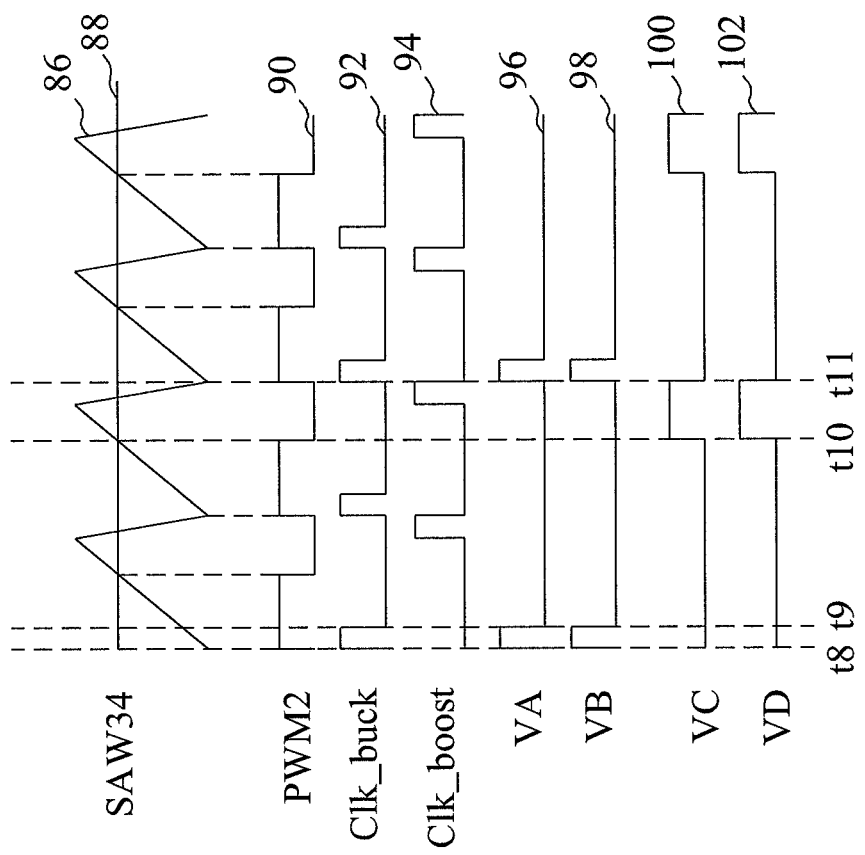
FIG. 7 is a waveform diagram of the power converter of FIG. 2 operating in a third mode.
Figure 8:
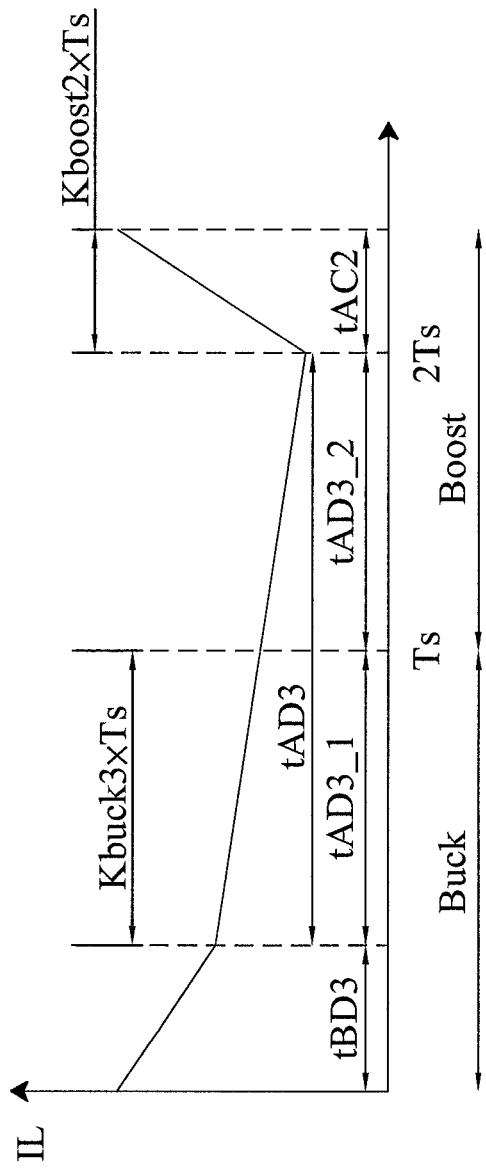
FIG. 8 is a diagram showing an inductor current and a switching sequence of the power converter of FIG. 2 operating in a third mode.

When the voltage ratio between the two terminals of the inductor L, as determined by the input voltage Vin, the output voltage Vout, and the load current Iload, is greater than one but smaller than a second threshold value, the power converter 30 operates in a third mode, and FIG. 7 is a waveform diagram thereof. FIG. 8 is a diagram showing the inductor current IL and a switching sequence of the power converter 30 operating in the third mode which is another buck-boost mode. During a time period from time t8 to time t9, the control signals VA, VB are high and the control signals VC, VD are low and hence, the switches SW1, SW3 are turned off and the switches SW2, SW4 are turned on. This time period from time t8 to time t9 is defined as tBD3. During a subsequent time period from time t9 to time t10, all the control signals VA-VD are low and thus, the switches SW1, SW4 are turned on and the switches SW2, SW3 are turned off. This time period from time t9 to time t10 is defined as tAD3. During a next time period from time t10 to time t11, the control signals VA, VB are low and the control signals VC, VD are high and therefore, the switches SW1, SW3 are turned on and the switches SW2, SW4 are turned off. This time period from time t10 to time t11 is defined as tAC2. In the third mode, all the switches SW1-SW4 have a switching period equal to 2Ts, and the inductor current IL also has a period equal to 2Ts. As shown in FIG. 8, each period of the inductor current IL includes buck and boost operations. In the third mode, the duties of the switches SW1, SW2 are determined by the clock Clk_buck and the switches SW1, SW2 have a fixed duty. Consequently, the buck duty ratio Kbuck3 during the buck operation is fixed, and the boost duty ratio Kboost2 during the boost operation is adjusted to stabilize the output voltage Vout.

Figure 9:
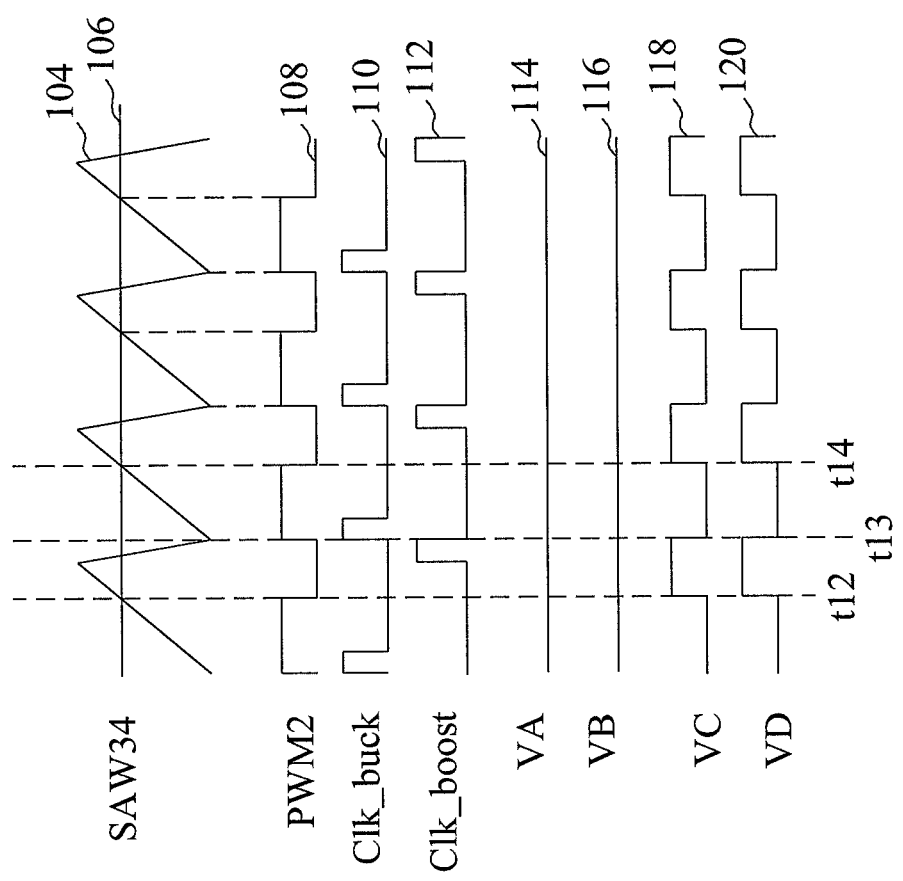
FIG. 9 is a waveform diagram of the power converter of FIG. 2 operating in a fourth mode.
Figure 10:
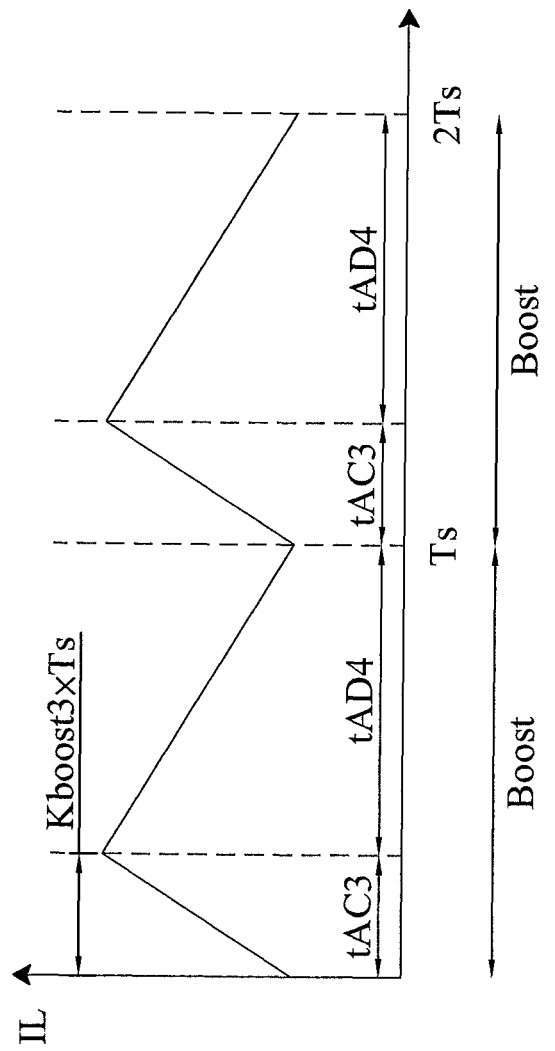
FIG. 10 is a diagram showing an inductor current and a switching sequence of the power converter of FIG. 2 operating in a fourth mode.

When the voltage ratio between the two terminals of the inductor L, as determined by the input voltage Vin, the output voltage Vout, and the load current Iload, is greater than the second threshold value, the power converter 30 operates in a fourth mode, and FIG. 9 is a waveform diagram thereof. FIG. 10 is a diagram showing the inductor current IL and a switching sequence of the power converter 30 operating in the fourth mode which is a pure boost mode. During a time period from time t12 to time t13, the control signals VA, VB are low and the control signals VC, VD are high and hence, the switches SW1, SW3 are turned on and the switches SW2, SW4 are turned off. This time period from time t12 to time t13 is defined as tAC3. During a subsequent time period from time t13 to time t14, all the control signals VA-VD are low and thus, the switches SW1-SW4 are turned on and the switches SW2, SW3 are turned off. This time period from time t13 to time t14 is defined as tAD4. In the fourth mode, both the switches SW3, SW4 have a switching period Ts, the inductor current IL has a period equal to Ts, and the boost duty ratio Kboost3 is equal to the duty ratio of the switch SW3.

As described above, when the power converter 30 operates in the buck-boost modes, the switches SW1-SW4 are switched in the sequence that (1) the switches SW2, SW4 are turned on and the switches SW1, SW3 turned off, (2) the switches SW1, SW4 are turned on and the switches SW2, SW3 turned off, and (3) the switches SW1, SW3 are turned on and the switches SW2, SW4 are turned off. Compared with the conventional power converters, the power converter 30 switches the switches SW1-SW4 less frequently during a same time period. In addition, when the power converter 30 enters the buck-boost modes from either the buck mode or the boost mode, the switching periods of the switches SW1-SW4 are extended from Ts to 2Ts and thereby the switching loss is reduced. Moreover, the novel switching sequence allows the inductor L to be continuously coupled to the power output terminal Vout for a prolonged period of time, thus lowering conduction loss.

Based on the voltage-second balance principle, it can be derived the relationship between the input voltage Vin, the output voltage Vout, and the load current Iload of the power converter 30 in the aforesaid four modes. Referring to FIG. 4, assuming that the voltage across each of the switches SW1-SW4 is Vsw, when the power converter 30 operates in the first mode, the input voltage Vin, the output voltage Vout, and the voltage Vsw will have the relationship $$V\text{in}-2V\text{sw}/(tAD1/Ts)=V\text{out}/(tAD1/Ts). \quad [\text{Eq-1}]$$

In the second mode, referring to FIG. 6, the input voltage Vin, the output voltage Vout, and the voltage Vsw will have the relationship $$V\text{in}-4V\text{sw}/(Ts+tAD2\_1)=V\text{out}[(Ts+tAD2\_2)/(Ts+tAD2\_1)]=V\text{out}[(2-K\text{boost1})Ts/(Ts+tAD2\_1)]. \quad [\text{Eq-2}]$$

In the third mode, referring to FIG. 8, the input voltage Vin, the output voltage Vout, and the voltage Vsw will have the relationship $$V\text{in}-4V\text{sw}/(Ts+tAD3\_1)=V\text{out}[(Ts+tAD3\_2)/(Ts+tAD3\_1)]=V\text{out}[(Ts+tAD3\_2)/(1+K\text{buck3})Ts]. \quad [\text{Eq-3}]$$

In the fourth mode, referring to FIG. 10, the input voltage Vin, the output voltage Vout, and the voltage Vsw will have the relationship $$V\text{in}-2V\text{sw}=V\text{out}(1-tAC3/Ts) \quad [\text{Eq-4}]$$

Figure 11:
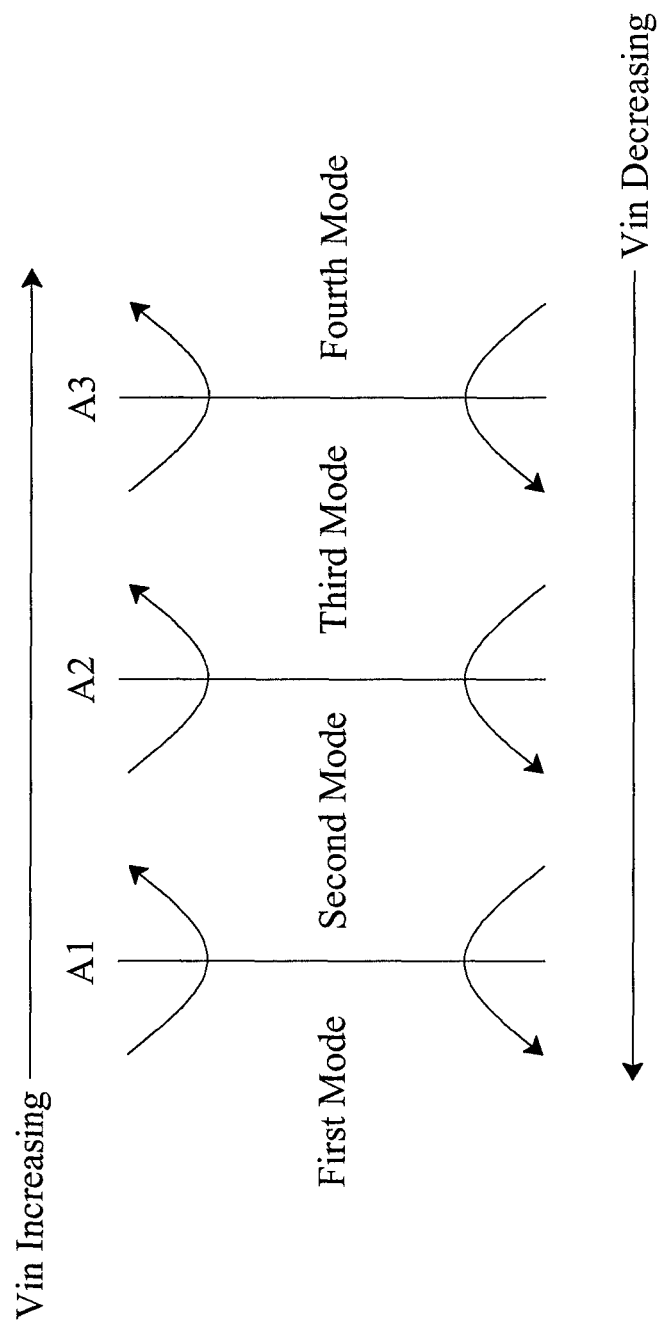
FIG. 11 is a mode transition chart of the power converter of FIG. 2.

In order to prevent the output voltage Vout from becoming unstable due to nonlinearity of the sawtooth signals SAW12 and SAW34, the maximum buck duty and the minimum boost duty are limited at K1 and K2 respectively, so as to stabilize the output voltage Vout when the input voltage Vin approaches or is equal to the output voltage Vout. FIG. 11 is a mode transition chart of the power converter 30. The mode transition of the power converter 30 may be determined according to the equations Eq-1 to Eq-4 and the threshold values K1 and K2. While the power converter 30 is operating in the first mode, if the input voltage Vin keeps dropping so that the voltage ratio between the two terminals of the inductor L is equal to a threshold value A1, the power converter 30 will switch to the second mode. While the power converter 30 is in the second mode, if the input voltage Vin continues decreasing and thus brings the voltage ratio between the two terminals of the inductor L to a threshold value A2, the power converter 30 will switch to the third mode. While the power converter 30 is in the third mode, if the input voltage Vin keeps decreasing so that the voltage ratio between the two terminals of the inductor L equals to a threshold value A3, the power converter 30 will switch to the fourth mode. While the power converter 30 is operating in the fourth mode, if the input voltage Vin keeps increasing, and in consequence the voltage ratio between the two terminals of the inductor L becomes equal to the threshold value A3, the power converter 30 will switch to the third mode. While the power converter 30 is operating in the third mode, if the input voltage Vin keeps increasing and thereby brings the voltage ratio between the two terminals of the inductor L to the threshold value A2, the power converter 30 will switch to the second mode. While the power converter 30 is in the second mode, if the input voltage Vin continues increasing so that the voltage ratio between the two terminals of the inductor L is equal to the threshold value A1, the power converter 30 will switch to the first mode.

Figure 12:
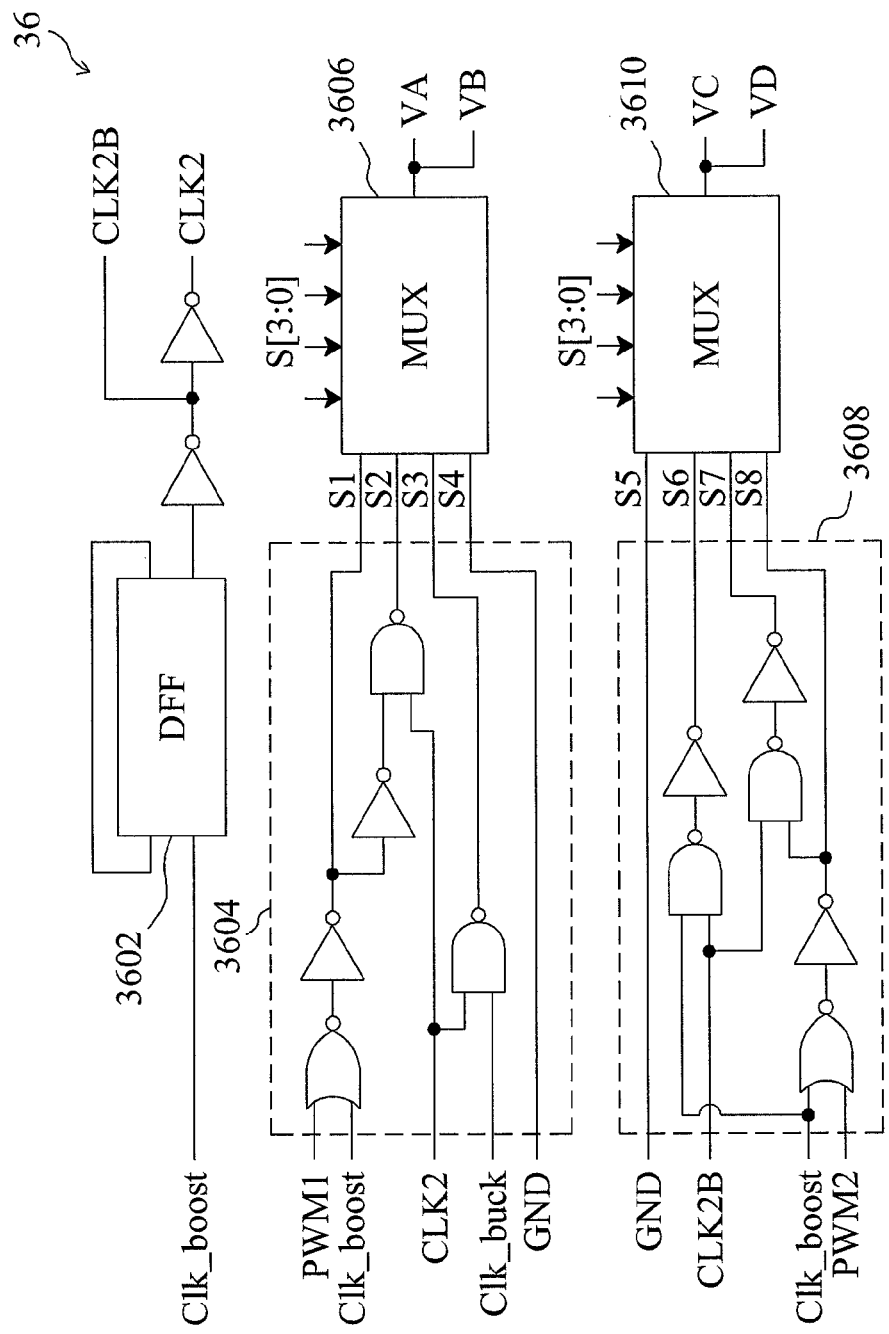
FIG. 12 is a circuit diagram of an embodiment for the control logic shown in FIG. 2.

FIG. 12 is a circuit diagram of an embodiment for the control logic 36 shown in FIG. 2, in which a D-type flip-flop 3602, which serves as a frequency divider, divides the frequency of the clock Clk_boost to generate clocks CLK2 and CLK2B, a logic circuit 3604 generates control signals S1, S2, S3 and S4 according to the signal PWM1, the clocks Clk_boost, CLK2, Clk_buck, and the potential at the ground terminal GND, a multiplexer 3606 selects the control signals VA and VB from the control signals S4, S3, S2, S1 according to the mode select signal S[3:0], a logic circuit 3608 generates control signals S5, S6, S7, S8 according to the potential at the ground terminal GND, the clocks CLK2B, Clk_boost, and the signal PWM2, and a multiplexer 3610 selects the control signals VC and VD from the control signals S8, S7, S6, S5 according to the mode select signal S[3:0].

Figure 13:
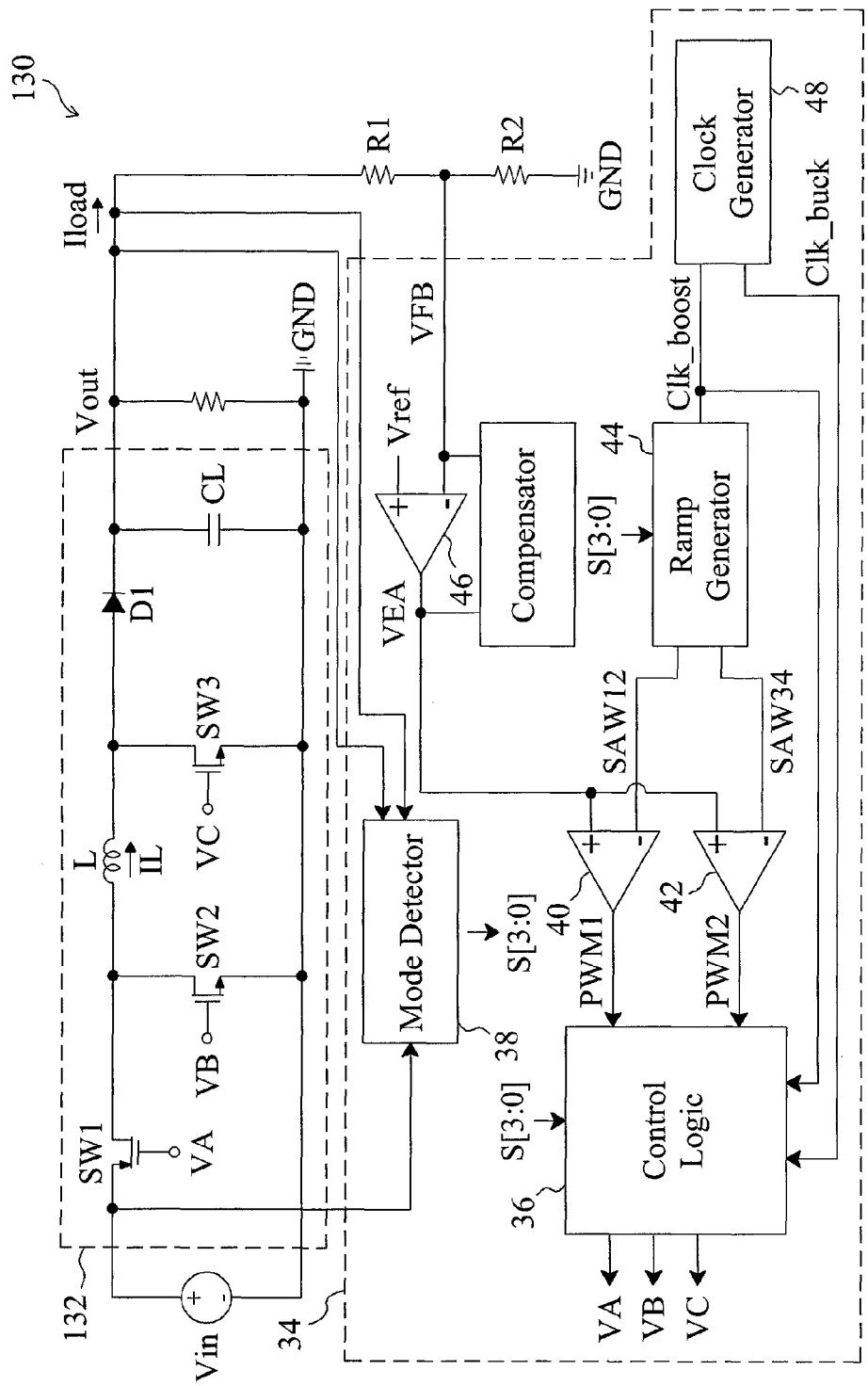
FIG. 13 is a circuit diagram of a second embodiment according to the present invention.

By replacing the switch SW4 in the buck-boost power converter 30 of FIG. 2 with a diode D1, a second embodiment according to the present invention is provided as shown in FIG. 13. The control and operation of this buck-boost power converter 130 is similar to that of the buck-boost power converter 30 of FIG. 2. When the buck-boost power converter 130 operates in the buck-boost modes, the switches SW1-SW3 are switched in the sequence that (1) the switch SW2 is turned on and the switches SW1, SW3 are turned off, (2) the switch SW1 is turned on and the switches SW2, SW3 are turned off, and (3) the switches SW1, SW3 are turned on, and the switch SW2 is turned off. These steps 1-3 are repeated in the same sequence. When the voltage ratio between the two terminals of the inductor L, determined by the input voltage Vin, the output voltage Vout, and the load current Iload, is greater than a first threshold value but smaller than one, the switch SW3 has a fixed duty. When the voltage ratio between the two terminals of the inductor L, determined by the input voltage Vin, the output voltage Vout, and the load current Iload, is greater than one but smaller than a second threshold value, each of the switches SW1 and SW2 has a fixed duty. When the power converter 130 is switched from the buck mode or the boost mode to the buck-boost modes, the switching periods of the switches SW1, SW2 and SW3 are extended from Ts to 2Ts.

Figure 14:
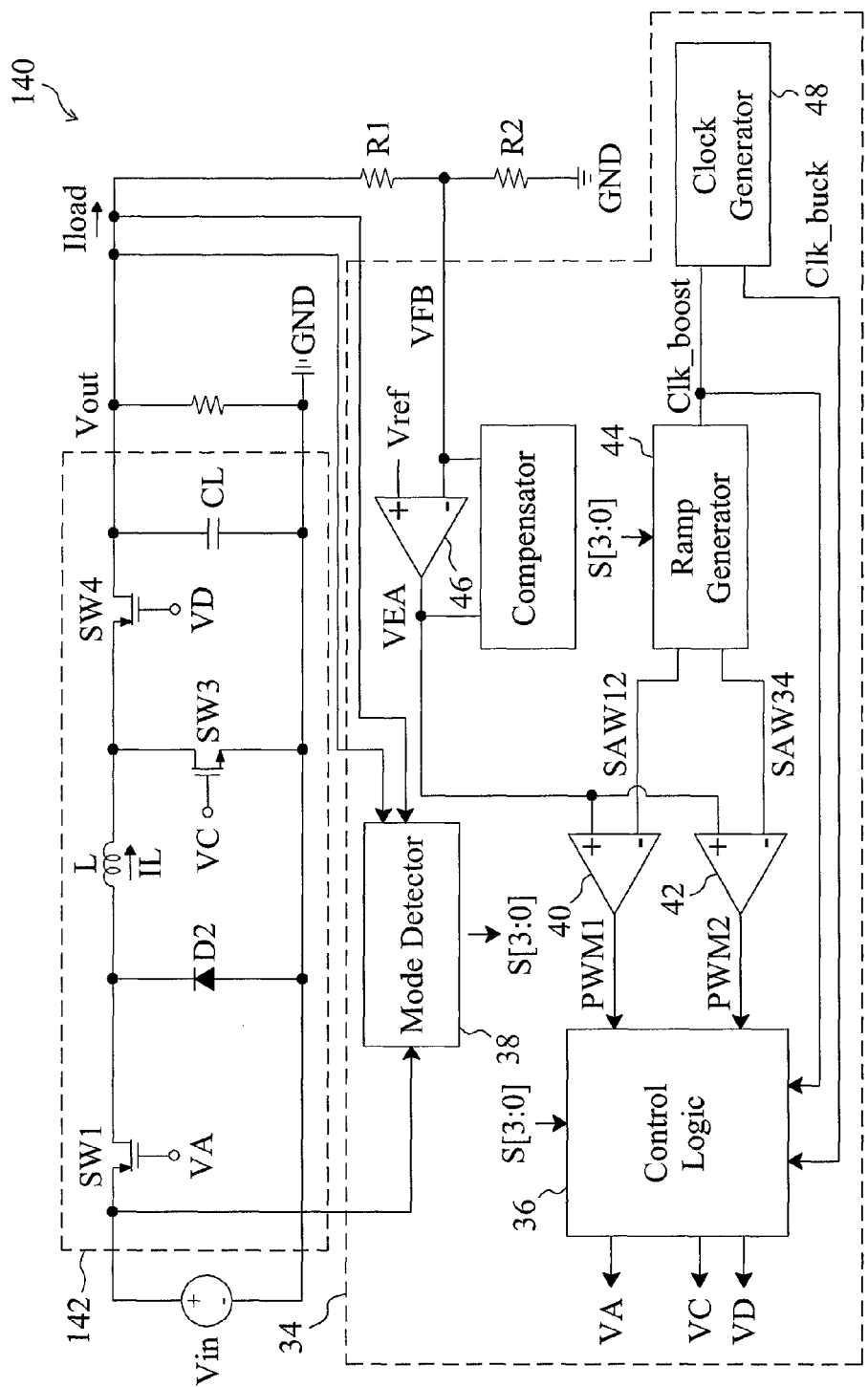
FIG. 14 is a circuit diagram of a third embodiment according to the present invention.

By replacing the switch SW2 in the buck-boost power converter 30 of FIG. 2 with a diode D2, a third embodiment according to the present invention is provided as shown in FIG. 14. The control and operation of this buck-boost power converter 140 is similar to that of the buck-boost power converter 30 of FIG. 2. When the power converter 140 operates in the buck-boost modes, the switches SW1, SW3, SW4 are switched in the sequence that (1) the switch SW4 is turned on and the switches SW1, SW3 are turned off, (2) the switches SW1, SW4 are turned on and the switch SW3 is turned off, and (3) the switches SW1 and SW3 are turned on and the switch SW4 is turned off. These steps 1-3 are repeated in the same sequence. When the voltage ratio between the two terminals of the inductor L, determined by the input voltage Vin, the output voltage Vout, and the load current Iload, is greater than a first threshold value but smaller than one, each of the switches SW3 and SW4 has a fixed duty. When the voltage ratio between the two terminals of the inductor L, determined by the input voltage Vin, the output voltage Vout, and the load current Iload, is greater than one but smaller than a second threshold value, the switch SW1 has a fixed duty. When the power converter 140 is switched from the buck mode or the boost mode to the buck-boost modes, the switching periods of the switches SW1, SW3, SW4 are extended from Ts to 2Ts.

Figure 15:
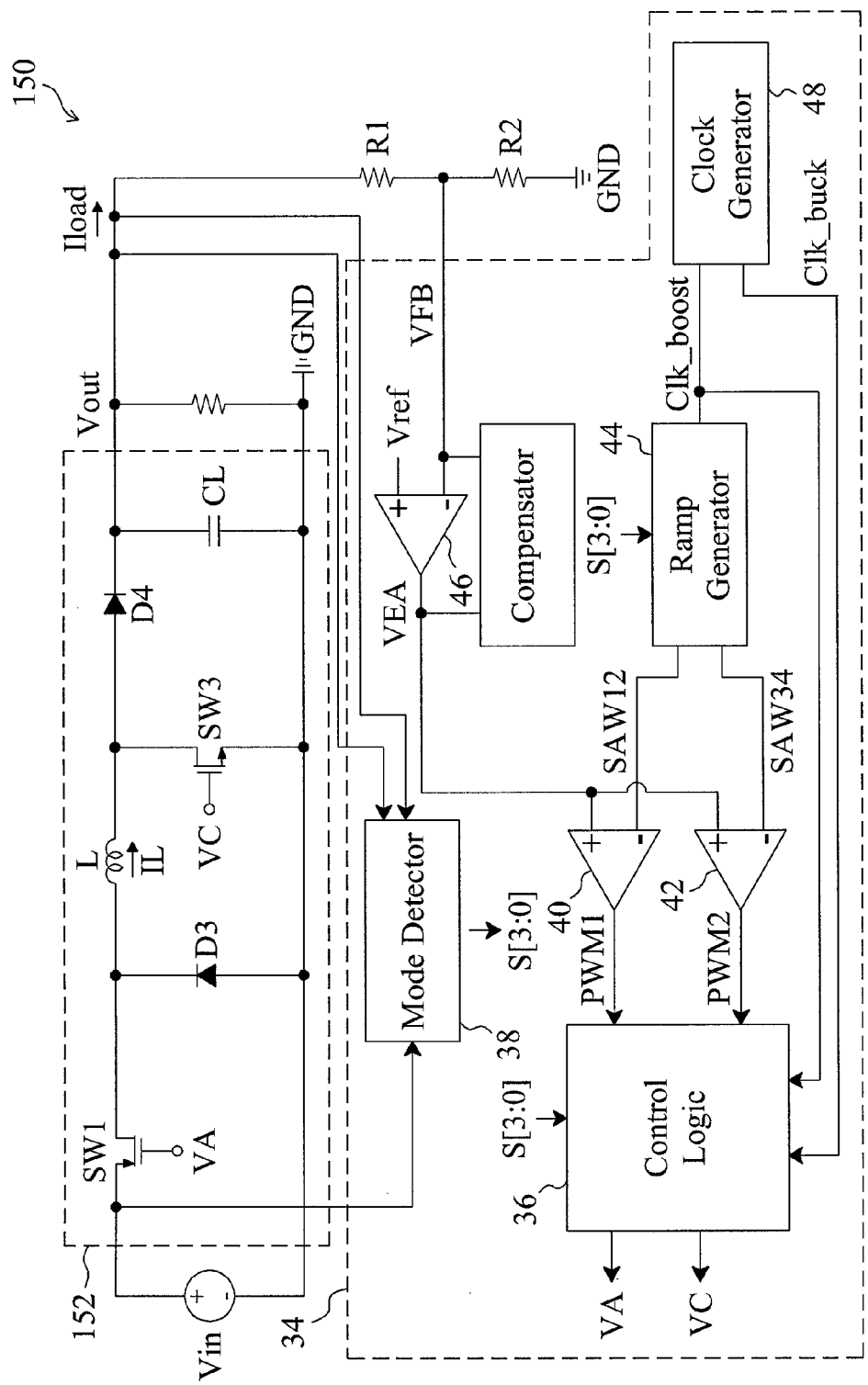
FIG. 15 is a circuit diagram of a fourth embodiment according to the present invention.

By replacing the switches SW2 and SW4 in the buck-boost power converter 30 of FIG. 2 with diodes D3 and D4 respectively, a fourth embodiment according to the present invention is provided as shown in FIG. 15. The control and operation of this buck-boost power converter 140 is similar to that of the buck-boost power converter 30 of FIG. 2. When the power converter 150 operates in the buck-boost modes, the switches SW1 and SW3 are switched in the sequence that (1) the switches SW1, SW3 are turned off, (2) the switch SW1 is turned on and the switch SW3 is turned off, and (3) the switches SW1, SW3 are turned on. These steps 1-3 are repeated in the same sequence. When the voltage ratio between the two terminals of the inductor L, determined by the input voltage Vin, the output voltage Vout, and the load current Iload, is greater than a first threshold value but smaller than one, the switch SW3 has a fixed duty. When the voltage ratio between the two terminals of the inductor L, determined by the input voltage Vin, the output voltage Vout, and the load current Iload, is greater than one but smaller than a second threshold value, the switch SW1 has a fixed duty. When the power converter 150 enters the buck-boost modes from either the buck mode or the boost mode, the switching periods of the switches SW1 and SW3 are extended from Ts to 2Ts.

Figure 16:
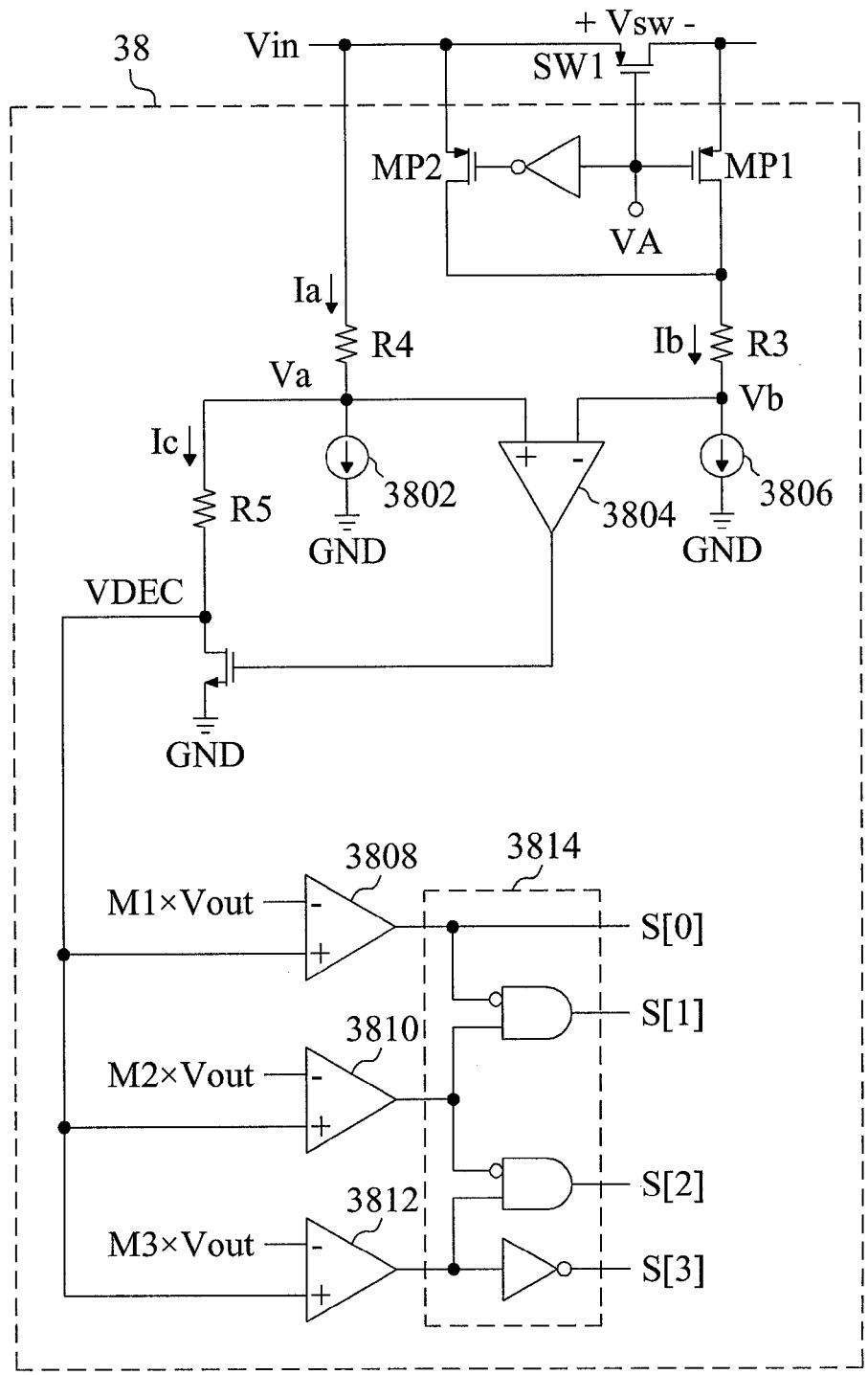
FIG. 16 is a circuit diagram of an embodiment for the mode detector in the embodiments.

FIG. 16 is a circuit diagram of an embodiment for the mode detector 38. Responsive to the switch SW1 turning on, a switch MP1 is simultaneously turned on to produce a voltage Vb=Vin−Vsw−Ib×R3, where Vsw is proportional to the load current Iload, an operational amplifier 3804 locks the voltage Vb and a voltage Va at a same level, and therefore a resistor R4 has a current Ia=(Vin−Va)/R4=(Vin−Vb)/R4=(Vsw+Ib×R3)/R4. By selecting current sources 3802 and 3806 equal to each other and R3=R4, a resistor R5 will have a current Ic=Ia−Ib=Vsw/R4 and thereby produce a voltage $$VDEC=Vin-Ia \times R4-Ic \times R5=Vin-Ib \times R4-Vsw-(R5/R4) \times Vsw=Vin-(1+R5/R4) \times Vsw-Ib \times R4. \quad [Eq-5]$$

Since the product (Ib×R4) can be designed to have a relatively small value and thereby be ignored, it will derive the voltage $$VDEC \cong Vin-(1+R5/R4)Vsw. \quad [Eq-6]$$

From the equation Eq-6, it is concluded that the voltage VDEC can be adjusted by adjusting the resistance ratio between R5 and R4. Comparators 3808, 3810 and 3812 compare the voltage VDEC with three threshold values (M1×Vout), (M2×Vout), and (M3×Vout) respectively, for a logic circuit 3814 to generate the mode select signal S[3:0].

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for a buck-boost power converter which includes an inductor, a first switch coupled between a power input terminal of the power converter and a first terminal of the inductor, a second switch coupled between the first terminal of the inductor and a ground terminal, a third switch coupled between a second terminal of the inductor and the ground terminal, and a fourth switch coupled between the second terminal of the inductor and a power output terminal of the power converter, the control method comprising:

monitoring an input voltage at the power input terminal, an output voltage at the power output terminal, and a load current at the power output terminal, for determining a voltage ratio between the two terminals of the inductor;

selecting one from a buck mode, a first buck-boost mode, a second buck-boost mode, and a boost mode according to the voltage ratio for the power converter;

amplifying a difference between a first signal and a reference voltage for generating a second signal, wherein the first signal is a function of the output voltage;

providing a first clock and a second clock;

generating a third signal and a fourth signal according to the first clock and the selected mode;

comparing the second signal with the third signal for generating a fifth signal;

comparing the second signal with the fourth signal for generating a sixth signal;

switching the first to fourth switches according to the selected mode, the fifth and sixth signals, and the first and second clocks; and in the first and second buck-boost modes, switching the first to fourth switches in a sequence including:

turning off the first switch, turning on the second switch, turning off the third switch, and turning on the fourth switch;

turning on the first switch, turning off the second switch, keeping the third switch off and keeping the fourth switch on; and keeping the first switch on, keeping the second switch off, turning on the third switch, and turning off the fourth switch.

2. The control method of claim 1, wherein the step of selecting one from a buck mode, a first buck-boost mode, a second buck-boost mode, and a boost mode according to the voltage ratio for the power converter comprises:

selecting the buck mode if the voltage ratio is smaller than a first threshold value;

selecting the first buck-boost mode if the voltage ratio is greater than the first threshold value but smaller than a second threshold value;

selecting the second buck-boost mode if the voltage ratio is greater than the second threshold value but smaller than a third threshold value; and selecting the boost mode if the voltage ratio is greater than the third threshold value.

3. The control method of claim 1, wherein each of the first and second switches in the buck mode has a first period, each of the first to fourth switches in the first buck-boost mode has a second period longer than the first period, each of the first to fourth switches in the second buck-boost mode has a third period longer than the first period, and each of the third and fourth switches in the boost mode has a fourth period shorter than each of the second and third periods.

4. The control method of claim 1, wherein each of the third and fourth switches has a fixed duty in the first buck-boost mode.

5. The control method of claim 1, wherein each of the first and second switches has a fixed duty in the second buck-boost mode.

6. A buck-boost power converter, comprising:
an inductor;
a first switch coupled between a power input terminal of the power converter and a first terminal of the inductor;
a second switch coupled between the first terminal of the inductor and a ground terminal;
a third switch coupled between a second terminal of the inductor and the ground terminal;
a fourth switch coupled between the second terminal of the inductor and a power output terminal of the power converter; and
a control circuit coupled to the power input terminal, the power output terminal, and the first to fourth switches, for determining a voltage ratio between the two terminals of the inductor according to an input voltage at the power input terminal, an output voltage at the power output terminal, and a load current at the power output terminal, selecting one from a buck mode, a first buck-boost mode, a second buck-boost mode, and a boost mode according to the voltage ratio for the power converter, and switching the first to fourth switches according to the selected mode;
wherein the control circuit comprises:
an error amplifier for amplifying a difference between a first signal and a reference voltage to generate a second signal, wherein the first signal is a function of the output voltage;
a clock generator for providing a first clock and a second clock;
a mode detector coupled to the power input terminal and the power output terminal, for detecting the input voltage, the output voltage, and the load current, to generate a third signal representative of the selected mode;
a ramp generator coupled to the clock generator and the mode detector, for providing a fourth signal and a fifth signal according to the third signal and the first clock;
a first comparator coupled to the error amplifier and the ramp generator, for comparing the second signal with the fourth signal to generate a sixth signal;
a second comparator coupled to the error amplifier and the ramp generator, for comparing the second signal with the fifth signal to generate a seventh signal; and
a control logic coupled to the mode detector, the clock generator, and the first and second comparators, for switching the first to fourth switches according to the third, sixth and seventh signals, and the first and second clocks, and wherein in the first and second buck-boost modes, the first to fourth switches are switched in a sequence including:
turning off the first switch, turning on the second switch, turning off the third switch, and turning on the fourth switch;
turning on the first switch, turning off the second switch, keeping the third switch off, and keeping the fourth switch on; and
keeping the first switch on, keeping the second switch off, turning on the third switch, and turning off the fourth switch.

7. The power converter of claim 6, wherein the control circuit selects the buck mode if the voltage ratio is smaller than a first threshold value, the first buck-boost mode if the voltage ratio is greater than the first threshold value but smaller than a second threshold value, the second buck-boost mode if the voltage ratio is greater than the second threshold value but smaller than a third threshold value, and the boost mode if the voltage ratio is greater than the third threshold value.

8. The power converter of claim 6, wherein the control logic comprises:
a frequency divider coupled to the clock generator, for dividing a frequency of the first clock to generate a third clock;
a first logic circuit coupled to the clock generator and the first comparator, for generating a first control signal, a second control signal, a third control signal, and a fourth control signal according to the sixth signal, the first to third clocks, and a second reference voltage;
a first multiplexer coupled to the mode detector, the first logic circuit, and the first and second switches, for selecting one from the first to fourth control signals according to the third signal, to switch the first and second switches;
a second logic circuit coupled to the clock generator and the second comparator, for generating a fifth control signal, a sixth control signal, a seventh control signal, and an eighth control signal according to the seventh signal, the first and third clocks, and a third reference voltage; and
a second multiplexer coupled to the mode detector, the second logic circuit, and the third and fourth switches, for selecting one from the fifth to eighth control signals according, to the third signal, to switch the third and fourth switches.

9. The power converter of claim 8, wherein the frequency divider comprises a D-type flip-flop.

10. The power converter of claim 6, wherein each of the first and second switches in the buck mode has a first period, each of the first to fourth switches in the first buck-boost mode has a second period longer than the first period, each of the first to fourth switches in the second buck-boost mode has a third period longer than the first period, and each of the third and fourth switches in the boost mode has a fourth period shorter than each of the second and third periods.

11. The power converter of claim 6, wherein each of the third and fourth switches has a fixed duty in the first buck-boost mode.

12. The power converter of claim 6, wherein each of the first and second switches has a fixed duty in the second buck-boost mode.

* * * * *